United States Patent Office 2,759,020
Patented Aug. 14, 1956

2,759,020

ALKYLENE BIS-(OXYALKYLENE AMMONIUM) COMPOUNDS

Emil Girod, Riehen, near Basel, Switzerland, assignor to J. R. Geigy A. G., Basel, Switzerland, a Swiss company No Drawing. Application June 8, 1953, Serial No. 360,360

Claims priority, application Switzerland June 13, 1952

5 Claims. (Cl. 260—567.6)

This invention concerns new diammonium compounds of the general formula:

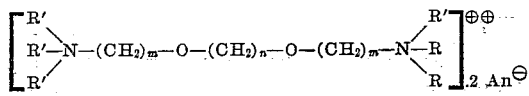

wherein
R stands for a low molecular alkyl radical,
R' represents alkyl radicals each having 5 to 10 carbon atoms,
$m$ represents a whole number from 2 to 4,
$n$ represents a whole number from 6 to 14, and
An ⊖ represents a monovalent anion, in particular of halogen hydracids or a normal equivalent of a polyvalent anion.

Such compounds can be produced by reacting ditertiary bis-aminoalkoxy-alkanes of the general formula:

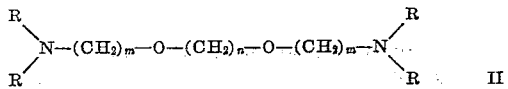

with two mols of reactive alkyl esters of the general formula:

R'—An' wherein

$m$ and $n$ have the meanings given above and An' represents an acid radical corresponding to the anion An' ⊖ of a halogen hydracid, alkyl sulphuric acid or aryl sulphonic acid, and if desired, finally exchanging An' ⊖ for another anion.

Compounds in which An ⊖ is different from An' ⊖, i. e. from the anion of a halogen hydracid, alkyl sulphuric acid or aryl sulphonic acid, are produced advantageously by later exchange of a halogen ion for other anions, by conventional methods.

Insofar as the group

in the end product is represented by a low molecular dialkylamino group (R=low molecular alkyl radical), also a ditertiary bis-aminoalkoxy-alkane of the general formula:

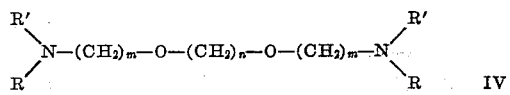

can be treated with 2 mols of reactive low molecular alkyl esters of the general formula:

R—An'     V

Finally two mols of tertiary amines of the general formula:

can be reacted with a bis-halogenalkoxy-alkane of the general formula:

Hal—(CH₂)ₘ—O—(CH₂)ₙ—O—(CH₂)ₘ—Hal    VII wherein Hal represents chlorine, bromine or iodine.

The ditertiary bis-aminoalkoxy-alkanes of the general Formula II necessary as starting materials for the general process first named above can be obtained for example by reacting α.ω-alkane diols of the general formula:

HO—(CH₂)ₙ—OH preferably in the form of their metal compounds (alcoholates) with 2 mols of tertiary aminoalkyl halides of the general formula

or by reacting α.ω-dihalogen alkanes of the general formula

Hal—(CH₂)ₙ—Hal with 2 mols of tertiary aminoalcohols of the general formula:

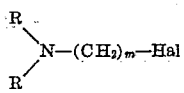

also advantageously in the form of their metal compounds. The second process is to be preferred when the corresponding tertiary aminoalkyl halides which are necessary in the first process are very instable, such as e. g. for the production of ditertiary bis-(δ-aminobutoxy)-alkanes. It is also possible however, to react the bis-halogenalkoxy-alkanes of the general formula VII with secondary amines of the general formula:

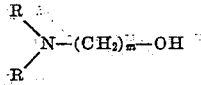

instead of with tertiary amines in order to obtain the ditertiary bis-aminoalkoxy-alkanes of the general Formula II.

The following can be named for example as ditertiary bis-aminoalkoxy-alkanes:

1.6 - bis - (β - dimethylamino - ethoxy) - hexane, B. P.₁₂ 162–164°,
1.6-bis-(γ-dimethylamino-propoxy)-hexane, B. P.₀.₀₈ 119–110–112°,
1.6-bis-(γ-dimethylamino-propoxy)-hexane, B. P.₀.₀₈ 119–123°,
1.6-bis-(γ-diethylamino-propoxy)-hexane, B. P.₀.₀₃ 133–135°,
1.6 - bis - (γ - dibutylamino - propoxy) - hexane, B. P.₀.₀₄ 192–195°,
1.6 - bis - (δ - dimethylamino - butoxy) - hexane, B. P.₀.₀₈ 136–138°,
1.6 - bis - (δ - diethylamino - butoxy) - hexane, B. P.₀.₀₇ 157–160°,
1.6 - bis - (β - dimethylamino - ethoxy) - 3 - methyl-hexane, B. P.₀.₀₉ 114–115°,
1.7-bis-(β-dimethylamino-ethoxy)-heptane, B. P.₀.₀₅ 138–141°,
1.8 - bis - (β - dimethylamino - ethoxy) - octane, B. P.₀.₀₅ 142–144°, 1.8 - bis - (β - diethylamino - ethoxy) - octane, B. P.$_{0.08}$ 156–158°, 1.8-bis-(γ-diethylamino-propoxy)-octane, B. P.$_{0.05}$ 163–165°, 1.9 - bis - (β - dimethylamino - ethoxy) - nonane, B. P.$_{0.06}$ 148–150°, 1.9 - bis - (β - diethylamino - ethoxy) - nonane, B. P. $_{0.06}$ 154–159°, 1.10 - bis - (β - dimethylamino - ethoxy) - decane, B. P.$_{0.04}$ 134–137°, 1.10-bis-(β-diethylamino-ethoxy)-decane, B. P.$_{0.035}$ 153–157°, 1 - (β - dimethylamino - ethoxy) - 10 - (γ - diethylamino-propoxy) - decane, B. P.$_{0.07}$ 153–158°, 1 - (β - diethylamino - ethoxy) - 10 - (γ - dimethylamino-propoxy) - decane, B. P.$_{0.03}$ 144–149°, 1.10-bis-(γ-dimethylamino-propoxy-decane, B. P.$_{0.02}$ 140–144°, 1.10-bis-(γ-diethylamino-propoxy)-decane, B. P.$_{0.03}$ 164–169°, 1.10-bis-(γ-dibutylamino-propoxy)-decane, B. P.$_{0.09}$ 230–231°, 1.11 - bis - (β - dimethylamino - ethoxy) - undecane, B. P.$_{0.18}$ about 152°, 1.12 - bis - (γ - diethylamino - propoxy) - dodecane, B. P.$_{0.001}$ about 130°, 1.14 - bis - (β - diethylamino - ethoxy) - tetradecane, B. P.$_{0.001}$ about 170–175°.

In particular the halides as well as sulphuric acid and aryl sulphonic acid esters can be used as reactive alkyl esters of the general formula R'—Am'.

As examples can be named: 2-amyl chloride, bromide and iodide, isoamyl, 2-methyl-butyl-, 2.2-dimethyl-propyl-, n-hexyl-, isohexyl-, 2-methyl-pentyl-, 3-methyl-pentyl-, n-heptyl-, n-octyl-, 2-ethyl-hexyl-, n-nonyl-, and n-decyl-chloride, -bromide and iodide.

If, in the processes given above for the production of ditertiary bis-aminoalkoxy-alkanes, compounds are used as starting materials which contain a mixed dialkylamino group instead of the low molecular dialkylamino group, starting materials are obtained in an analogous manner for the second general process given above for the production of the diammonium compounds, e. g. 1.10-bis-[β-(n-amyl-methylamino)-ethoxy]-decane or 1.10-bis [γ-(isoamyl-methylamino)-propoxy]-decane. These compounds are obtained by reacting for example, tertiary aminoalkyl halides of the general formula

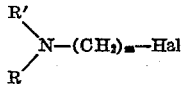

with metal compounds of α.ω-alkane diols or by reacting tertiary amino alcohols of the general formula

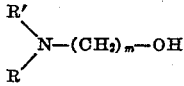

with α.ω-dihalogen alkanes; also mixed dialkylamines of the general formula:

can be reacted with bis-halogenalkoxy-alkanes of the general formula VII.

In addition for the production of such starting materials for example also diprimary bis-aminoalkoxy alkanes such as bis-aminopropoxy alkanes which are easily accessible by reacting α. -alkane diols with 2 mols of acrylonitrile and then hydrogenating, can be reacted under reducing or hydrogenating conditions with 2 mols of alkanols which have at least 5 carbon atoms. The bis-(alkylamino-alkoxy)-alkanes which are so obtained can then either be converted into bis-(dialkylamino-alkoxy)-alkanes of the general formula IV or the desired diammonium compounds in general formula I can be obtained in one process without isolating the above named ditertiary intermediate products.

As reactive low molecular alkyl esters which can be reacted with bis-(dialkylamino-alkoxy)-alkanes (IV) according to the second general process can be named for example, methyl bromide, methyl iodide, ethyl chloride, ethyl bromide, ethyl iodide, propyl bromide, propyl iodide, butyl bromide, butyl iodide, isobutyl bromide, hexyl bromide, allyl bromide and allyl iodide as well as dimethyl sulphate, diethyl sulphate and p-toluene-sulphonic acid methyl ester.

The bis-halogenalkoxy-alkanes of the general formula VII which are starting materials for the third general process for the production of the new diammonium compounds, such as 1.2-bis-(δ-bromobutoxy)-ethane, can be obtained for example by reacting bis-(hydroxy-alkoxy)-alkanes with phosphorus halides. Bis-hydroxyalkoxy-alkanes can be obtained for example by reacting α.ω-dihalogen alkanes with excess α.ω-alkane diols by means of sodium. The tertiary substituted amines which are necessary as second reaction component in this process are easily obtained e. g. by reacting alkyl halides with the corresponding secondary amines.

The diammonium compounds produced according to the present invention can be used for pharmaceutical purposes. In particular they influence the muscle tonus, in that they exert a muscle relaxing action similar to curare.

The following examples illustrate the invention further. Parts are given as parts by weight, preferably in grammes. The relationship of parts by weight to parts by volume is as that of grammes to cubic centimetres. The temperatures are in degrees Centigrade.

*Example*

3.16 parts of 1.10-bis-(β-dimethylamino-ethoxy)-decane are dissolved in 20 parts by volume of acetone and 3.47 parts of isoamyl bromide (molecular ratio 1:2.2) are added and the whole is heated for about 14 hours under reflux. The diquaternary salt crystallises out on standing. It is filtered off under suction, washed with acetone and dried in a high vacuum at 50–60°. 1.10-bis-[β-isoamyl-dimethyl-ammonium)-ethoxy]-decane-dibromide melts at about 150–156°.

If, instead of isoamyl bromide, n-amyl bromide is used, 1.10-bis-[β-(n-amyl-dimethyl - ammonium) - ethoxy]-decane-dibromide is obtained in the same manner. After recrystallising from a little abs. methanol with the addition of butanone, it melts at 182°.

1.10-bis-[β-(n-hexyl-dimethyl-ammoniub)ethoxy] - decane-dibromide (M. P. 180°) is obtained in an analogous way if 3.8 parts of n-hexyl bromide are used.

Similarly 1.9-bis-[β-(n-hexyl - dimethyl - ammonium)-ethoxy]-nonane-dibromide is obtained from 3.02 parts of 1.9-bis-(β-dimethylamino-ethoxy)-nonane and 3.8 parts of hexyl bromide. M. P. 122–124°.

The following can be produced in an analogous manner, e. g.

1.6-bis-[β-(n-amyl-dimethyl-ammonium)-ethoxy]-hexane-dichloride, 1.6-bis-[γ-(n-hexyl-dimethyl-ammonium) - propoxy]hexane-dimethosulphate, 1.7-bis-[β-(isoamyl-dimethyl-ammonium)-ethoxy] - heptane-dichloride, 1.6-bis-[β-(n-amyl-dimethyl-ammonium)-ethoxy]-3-methyl hexane hexane-dibromide, 1.8-bis-[β-(isoamyl-dimethyl-ammonium)-ethoxy]-octane-dichloride 1.9-bis-[β-(n-amyl-dimethyl-ammonium)-ethoxy]-nonane-dichloride, 1.10-bis-[β-(n-amyl-dimethyl-ammonium) - ethoxy] - decane-dibromide, 1.10-bis-[β-(n-octyl-dimethyl-ammonium)-ethoxy]-decane-di-iodide,
1.10-bis-[β-(n-heptyl-dimethyl-ammonium)-ethoxy]-decane-dibromide,
1.10-bis-[β-(isoamyl-dimethyl-ammonium)-ethoxy)-decane-dichloride,
1.10-bis-[β-(n-hexyl-diethyl-ammonium)-ethoxy]-decane-di-iodide,
10.10-bis-[γ-(n-amyl-dimethyl-ammonium)-propoxy]-decane-dibromide,
1.10-bis-[γ-(isoamyl-dibutyl-ammonium)-propoxy]-decane-dibromide,
1.10-bis-[δ-(n-amyl-dimethyl-ammonium)-butoxy]-decane-dibromide,
1.11-bis-[β-(isoamyl-dimethyl-ammonium)-ethoxy]-undecane-dichloride,
1.11-bis-[β-(n-hexyl-methyl-ethyl-ammonium)-ethoxy]-undecane-dibromide,
1.12-bis-[β-(-n-amyl-dimethyl-ammonium)-ethoxy]-dodecane-dichloride,
1.12-bis-[β-(isoamyl-diethyl-ammonium)-ethoxy]-dodecane-dichloride,
1.12-bis-[β-(n-amyl-dipropyl-ammonium)-ethoxy]-dodecane-dibromide,
1.13-bis-[β-(isoamyl-dimethyl-ammonium)-ethoxy]-tridecane-dichloride,
1.14-bis-[β-(n-hexyl-dimethyl-ammonium)-ethoxy]-tetradecane-di-iodide,
1.14-bis-[β-(n-amyl-diethyl-ammonium)-ethoxy]-tetradecane-dibromide.

What I claim is:
1. A diammonium compound of the formula

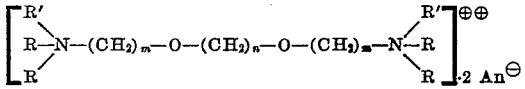

wherein
R stands for a low molecular alkyl radical,
R' represents an alkyl radical having 5 to 10 carbon atoms,
m represents an integer from 2 to 4,
n represents an integer from 6 to 14, and
An⊖ represents a therapeutically useful monovalent anion.

2. A diammonium compound of the formula

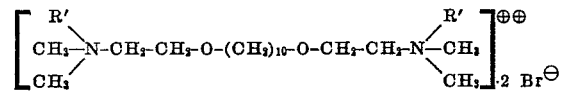

wherein R' represents an alkyl radical having 5 to 10 carbon atoms.

3. 1.10-bis-[β-(isoamyl-dimethyl-ammonium)-ethoxy]-decane dibromide.

4. 1.10-bis-[β-(n-amyl-dimethyl-ammonium)-ethoxy]-decane dibromide.

5. 1.9-bis-[β-(n-hexyl-dimethyl-ammonium)-ethoxy]-nonane dibromide.

References Cited in the file of this patent
UNITED STATES PATENTS
2,683,147    Girod _____ July 6, 1954
FOREIGN PATENTS
511,220    Belgium _____ May 31, 1952
841,917    Germany _____ June 19, 1952
OTHER REFERENCES
Unna et al., Annals of the New York Academy of Sciences 54, (Art. 3) 425, Oct. 30, 1951.
Girod et al., Experientia 8, 233–34 (1952).